July 16, 1957 L. P. GREENE ET AL 2,799,160
WIND TUNNEL AIR FLOW CONTROL
Filed March 28, 1955 4 Sheets-Sheet 1
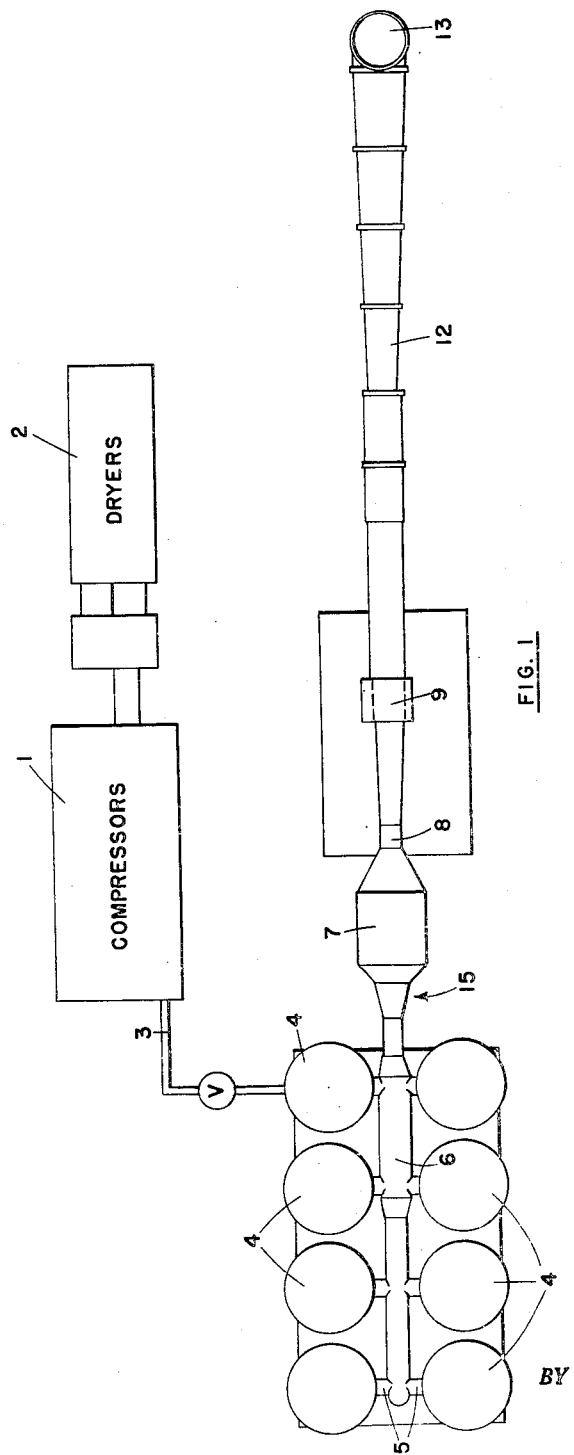
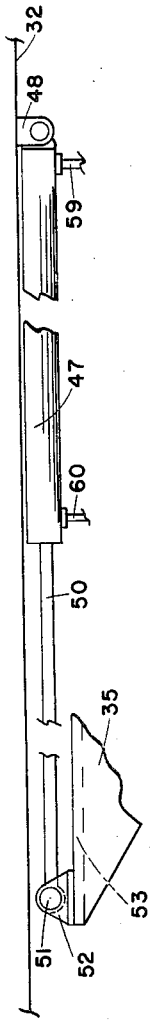
*INVENTORS.*
LAWRENCE P. GREENE
CHARLES R. LEEF
BY WALTER E. FELLERS
William L. Lane
ATTORNEY July 16, 1957 L. P. GREENE ET AL 2,799,160
WIND TUNNEL AIR FLOW CONTROL
Filed March 28, 1955 4 Sheets-Sheet 2

*INVENTORS.*
LAWRENCE P. GREENE
CHARLES R. LEEF
BY WALTER E. FELLERS

ATTORNEY

July 16, 1957 L. P. GREENE ET AL 2,799,160
WIND TUNNEL AIR FLOW CONTROL
Filed March 28, 1955 4 Sheets-Sheet 3
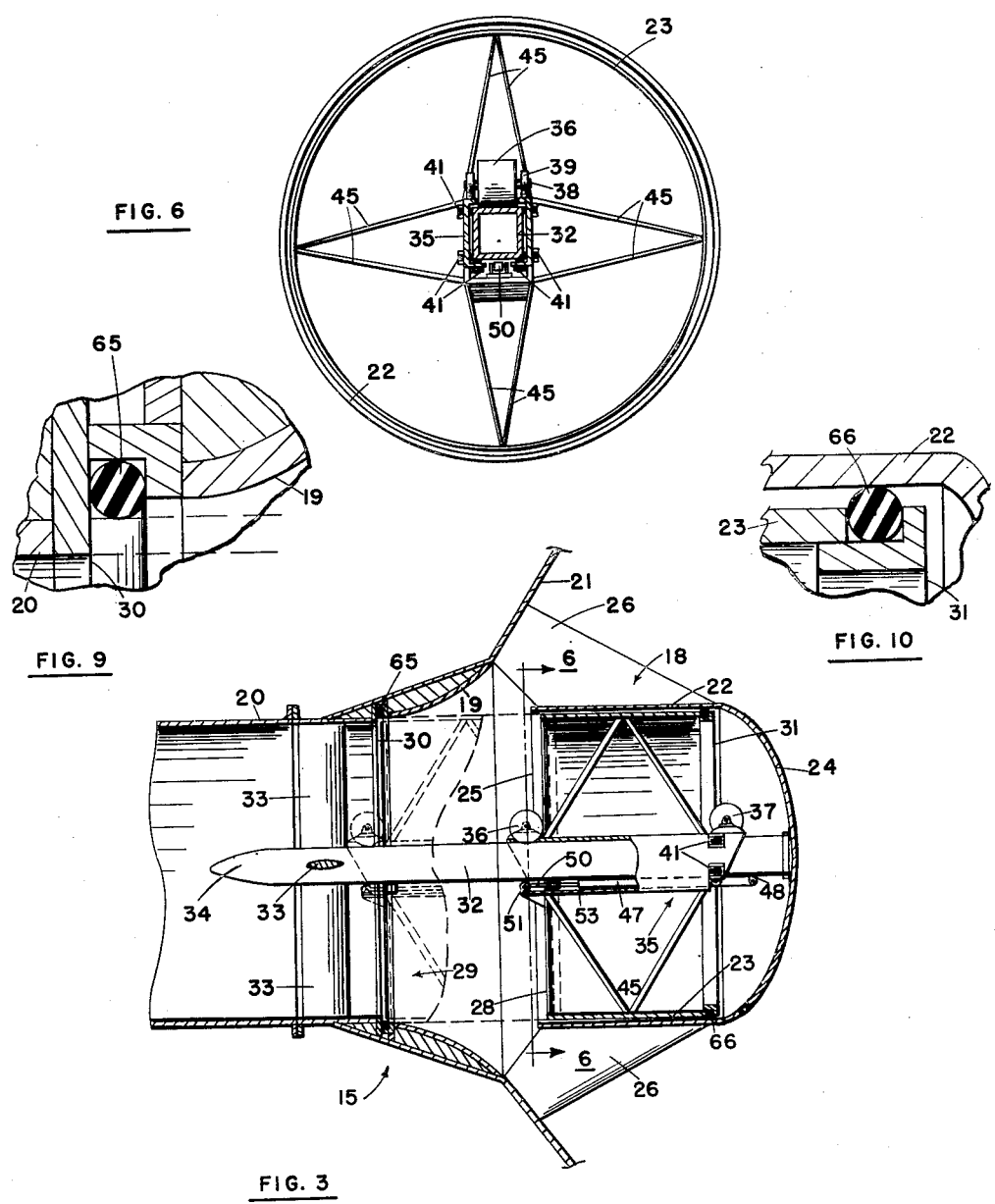
INVENTORS.
LAWRENCE P. GREENE
CHARLES R. LEEF
BY WALTER E. FELLERS
William R. Laue
ATTORNEY July 16, 1957  L. P. GREENE ET AL  2,799,160
WIND TUNNEL AIR FLOW CONTROL
Filed March 28, 1955  4 Sheets-Sheet 4
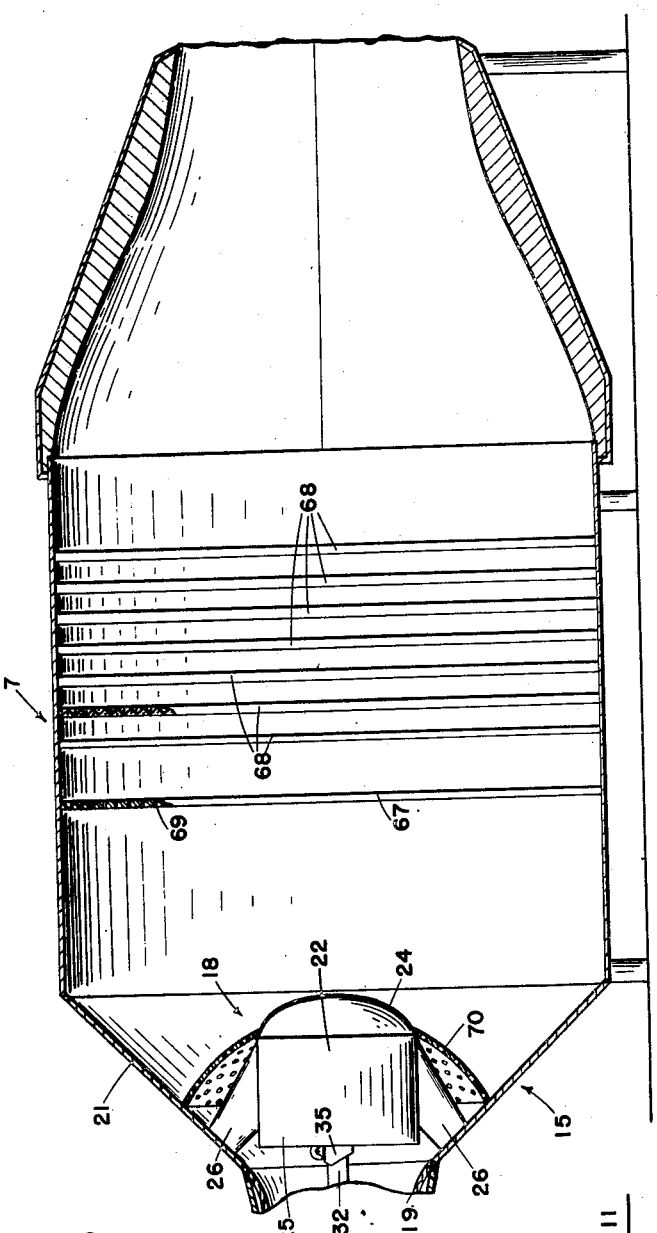
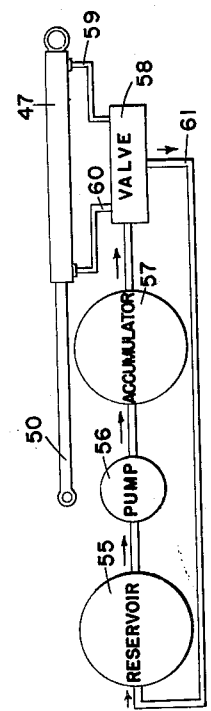
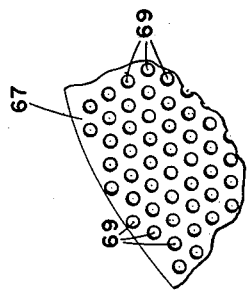
*INVENTORS.*
LAWRENCE P. GREENE
CHARLES R. LEEF
BY WALTER E. FELLERS
ATTORNEY

United States Patent Office 2,799,160
Patented July 16, 1957

2,799,160
WIND TUNNEL AIR FLOW CONTROL

Lawrence P. Greene, Inglewood, and Charles R. Leef and Walter E. Fellers, Los Angeles, Calif., assignors to North American Aviation, Inc.

Application March 28, 1955, Serial No. 497,104

10 Claims. (Cl. 73—147)

This invention pertains to a wind tunnel control valve and more particularly to a valve for shutting off or throttling the flow to a wind tunnel test section.

Modern wind tunnels are often capable of producing supersonic velocities in the test section and may require large quantities of air flow. It is necessary to provide a valve arrangement for throttling and controlling the air flow as well as shutting off before and after a test run. It is not only important that the throttling be exact but the valve should not provide a disturbance in the air flow which will lead to irregular flow conditions in the test section resulting in erroneous test data. Furthermore, the valve should be fast acting, require low power and be safe in its operation. In the past it has been customary in wind tunnel design to provide a pivotal type of valve member such as a butterfly valve or a shutter arrangement. Such a valve member can pivot from a closed position across the diameter of the wind tunnel to an open position parallel to the wind stream in the tunnel and can thereby throttle and control the flow. However, a butterfly type control valve arrangement has serious limitations. The pivotal arrangement means that the air will be nonuniformly controlled across the section of the wind tunnel and an uneven and unsatisfactory flow in the test section can result unless somewhat elaborate flow straightening features are added to the tunnel. The pivotal type arrangement means that the change in air flow for movement of the valve member at the portion near the axis will be relatively small compared with the change at the portions at 90° to the axis. Furthermore the power requirements are relatively large, the speed of action may not be sufficient and other undesirable features are inherent in such a design.

According to the provisions of this invention a valve is provided which is movable along the axis of the wind tunnel throttling in a manner to provide an absolutely uniform flow distribution with resulting high accuracy in the wind tunnel test section. This is accomplished by two sleeve members in a divergent section of the wind tunnel, one of these members being closed at the downstream end. The other member is movable relative to the closed sleeve and may be adjusted upstream toward the throat of the divergent section of the tunnel to provide throttling and shut-off of the air flow.

Accordingly, it is an object of this invention to provide a wind tunnel control valve which results in a uniform air flow. Another object of this invention is to provide a wind tunnel control valve giving accuracy of throttling and rapid action. A further object of this invention is to provide a wind tunnel control valve of simple construction and low power requirements. Yet another object of this invention is to provide a wind tunnel control valve which will fail safe by automatically closing should the power supply fail. These and other objects will become apparent from the following detailed description taken in connection with the accompanying drawings in which Fig. 1 is a plan view of the overall wind tunnel arrangement;

Fig. 3 is a side sectional view of the valve at the throat of the divergent section;

Fig. 6 is a sectional view taken along line 6—6 of Fig. 3;

Fig. 7 is a fragmentary view illustrating the power cylinder mounting;

Fig. 8 is a schematic view of the hydraulic arrangement for the power cylinder;

Figs. 9 and 10 are enlarged detail showings of the annular seals used by the valve;

Fig. 11 is a side sectional view of the plenum section, including the arrangement of screens therein; and Fig. 12 is a fragmentary view of a damping screen.

Figure 5:
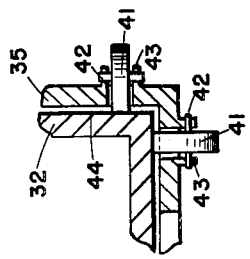
Fig. 5 is an enlarged detail showing of the guide roller mounting.

Referring to Fig. 1 of the drawing a typical wind tunnel layout is illustrated, being of the blow-down type in which pressurized air is stored in a plurality of tanks which discharges through the wind tunnel when a test is run. This system includes compressors 1 obtaining air from dryers 2 and connected through line 3 to a plurality of spherical air storage tanks 4. The number and size of these tanks will depend upon the size of the tunnel and the pressure of the air will be governed by the Mach number which is to be obtained. Such a wind tunnel, for example, may have eight storage tanks each of around thirty-six feet in diameter and 200,000 cubic feet of volume, to be pressurized to approximately ten atmospheres. Outlets 5 from the tanks lead to a common header 6 which enters into a plenum and approach chamber 7. A nozzle 8 is connected to chamber 7 and to test section 9 where the model to be tested is located. The air dischaarges from the test section through diffuser 12 and into the atmosphere at outlet 13. For testing purposes, therefore, the compressors supply dried pressurized air to the storage tanks which air is then discharged through the plenum 7, the nozzle 8 and into the test section for a test run. The test period will vary in duration and the velocity requirements will differ whereby it is necessary to throttle and control the air flow out of the storage tanks into the plenum chamber 7 so as to maintain a constant pressure therein during the test run. In order to provide a substantially constant velocity during a testing period the control valve is first moved rapidly toward a full open position so that the plenum chamber is quickly charged to its operating pressure, after which the valve is returned and controlled so that this pressure is maintained. This may require initial valve movement to the full open position in about one second of time, followed by throttling back toward the closed position approximately one second later. After this the valve is gradually reopened as the pressure drops in the storage tanks. Finally, at the conclusion of the test run, the control valve will be completely shut off.

Figure 2:
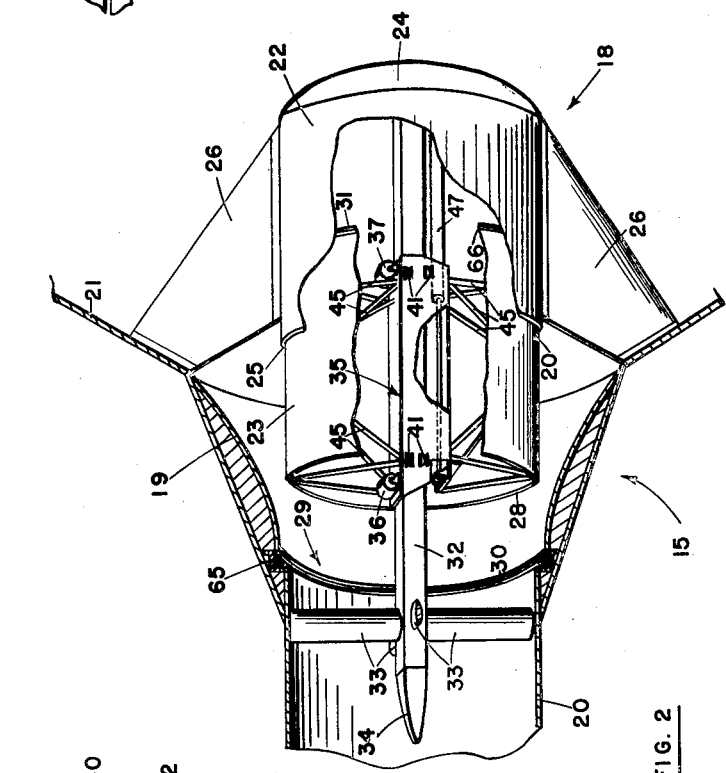
Fig. 2 is a perspective view, partially broken away, illustrating the valve in the divergent tunnel section.

The control valve of this invention is located at divergent portion 15 at the entrance of the plenum section, the general arrangement of the valve being best seen by perspective showing of Fig. 2. Valve 18 is disposed at the upstream portion of divergent section 15 where smoothly contoured wall 19 interconnects the wall of cylindrical intake 20 and wall 21 of the divergent section of the plenum chamber. The valve itself comprises two sleeve members 22 and 23 which are concentric and located with their axes along the central axis of the wind tunnel. Sleeve 22 has a closed downstream end 24 while the upstream end 25 is open to admit sleeve 23. Struts 26 extend from the exterior surface of sleeve 22 to wall 21 to provide a support for the sleeve, positioning the sleeve in its axially aligned location. There may be any desired number of these support struts, but two have been illustrated for purposes of clarity.

Sleeve 23 is movable along its axis from a downstream position withdrawn into sleeve 22 to an upstream extended position where outer end 28 thereof is disposed near throat 29 of divergent section 15. The outside diameter of sleeve 23 is approximately the same as the diameter of throat 29 whereby the sleeve serves to shut off the air flow when it is completely extended upstream into the throat, and will throttle the air to a varying degree depending upon its position as it is moved from its retracted position. Because the main plenum diameter is greater than that of throat 29 axial movement of sleeve 23 will change the size of the opening at the throat to control the air flow. Gradual rather than abrupt divergence in section 15 permits uniform throttling for each increment of sleeve movement regardless of its axial position. Throttling is symmetrical around the circumference of the valve. When fully extended, end 28 of sleeve 23 engages shoulder 30, formed in the wind tunnel wall, to shut off air flow. When the valve is closed no pressure will be imposed on upstream end 28 where it engages the shoulder, while downstream end 31 remains under the full storage tank pressure. Also, the downstream side of annular seal 66 will be subjected to full pressure while the upstream side it not. Therefore the valve tends to remain closed, whereby an important safety advantage over conventional valves is realized. In the illustration of Fig. 2 the sleeve 23 is in an intermediate position whereby air flow from section 20 into the plenum section and from thence into the test section will be partially throttled. In Fig. 3 sleeve 23 is shown fully retracted in solid lines while it is extended fully to its upstream position as shown in phantom in this figure.

Figure 4:
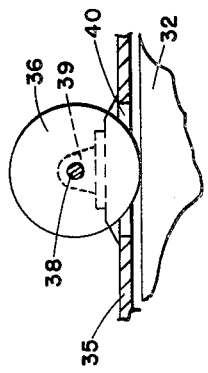
Fig. 4 is an enlarged detail showing of the main support roller mounting.

In order to provide for the movement of sleeve 23 relative to sleeve 22 a beam 32 is carried by end wall 24 of member 22 extending upstream therefrom into section 20 where it is supported by four streamlined struts 33. The upstream end 34 of beam 32 is of generally conoidal shape also to lower the resistance to air flow, while the remainder of the beam is preferably square as illustrated. A carriage 35 receives beam 32 and is movable relative thereto. The main support for the carriage comes from rollers 36 and 37 which are roatably carried by brackets on the upper surface of the carriage and project through apertures in this surface to engage the upper surface of beam 32. A fragmentary detail showing of this arrangement can be seen in Fig. 4, wherein roller 36 can be seen mounted by shaft 38 and bracket 39 to project through aperture 40 in the carriage to engage the beam. Additional rollers are included on the sides and bottom of the carriage to serve as a guide to center the carriage at all times with respect to beam 32, as well as provide a friction-free connection therewith. These small rollers 41 are mouned similarly to the arrangement for rollers 36 and 37 likewise projecting through apertures in the carriage to engage the sides of the shaft. The fragmentary sectional view of Fig. 5 illustrates this construction. Shafts 42 are carried by brackets 43, serving to mount rollers 41 so as to project through apertures 44 in the carriage to engage beam 32. In this manner the carriage is made freely slidable along the surfaces of the shaft and is maintained in an axially aligned relationship therewith.

Sleeve 23 is in turn supported by and movable with the carriage. This is accomplished by means of struts which extend from the carriage to the inner diameter of sleeve 23. Accordingly, as may be seen in Fig. 2 as well as in Figs. 3 and 6, struts 45 extend from the carriage to the sleeve and rigidly position the sleeve with respect to the carriage. (In Fig. 2 the horizontal sets of struts have been omitted for purposes of clarity.)

The power drive for the sleeve 23 may be effected in a variety of ways, but in the preferred embodiment is accomplished by means of a hydraulic cylinder arrangement as may best be seen in Fig. 7. To this end hydraulic cylinder 47 is attached by bracket 48 to the undersurface of beam 32. The cylinder arrangement may be of the ordinary type having a piston therein connected to a rod 50 which projects from one end of the cylinder. The rod connects at 51 to a bracket 52 which is secured to the bottom plate 53 of the carriage. This means that when the cylinder is pressurized the rod 50 can be caused to either extend or retract, thereby through the connection at 51 causing axial movement of sleeve 23 along beam 32.

The schematic arrangement of the means for driving the sleeve may be seen in Fig. 8. Thus cylinder 47 has a connection on either end thereof so that pressurized fluid can be admitted to either side of the piston. A reservoir 55 supplies a pump 56, connected in turn to an accumulator 57. Valve 58 receives pressurized fluid from the accumulator. This valve will supply the pressurized fluid to either end of cylinder 47 through lines 59 and 60 for extending or retracting rod 50, while return to the reservoir is effected through line 61.

It may be seen thus far that the sleeve arrangement is simple in design and construction and of relatively light weight. Sleeve 23 is open on both ends whereby this sleeve is nearly aerodynamically balanced in the wind stream. As a result the power requirements are quite low and the hydraulic cylinder 46 is of relatively small size as shown despite the speed necessary for valve opening and closing. An important safety feature results from the balanced design as described. By virtue of the high velocity of air past forward end 28 of sleeve 23 a reduction in pressure at this portion of the valve will result. However, the air which is at the opposite end 31 of sleeve 23, which is within sleeve 22, is virtually static, so there will be no pressure reduction at that end. This means that if for some reason the hydraulic fluid should leak from the drive system of sleeve 23 while the wind tunnel was in operation, sleeve 23 would immediately and automatically move to engagement with shoulder 30 to close the valve. Thus the pressure differential will cause the valve to fail safe, while the frontal area of the sleeve is relatively small so that the unbalance is not sufficient to offer appreciable opposition to the power cylinder.

As the valve is illustrated an annular seal 65 is provided adjacent shoulder 30 while a second annular seal 66 is disposed on the outer surface of sleeve 23 at end 31 thereof, best seen in fragmentary detail showings of Figs. 9 and 10. Seal 65 serves to seal between wall 19 and the outer surface of sleeve 23 when the valve is closed so that no air flow will be permitted to pass througb the tunnel and no leakage will occur. Similarly, seal 66 prevents air from leaking between the two sleeve members and is thus effective while the valve is closed and also when the valve is open. If desired, the seal at shoulder 30 and between the two sleeves need not employ annular seals of this type. Because of the fact that the mating parts are cylindrical in shape it is not difficult to provide closely interfitted surfaces between these members. Thus the parts actually may be lapped in place even though in a typical example the throat of the divergent section is eight feet in diameter. If these members are lapped in place it will not then be necessary to employ any annular seals at all. The wear on these cylindrical surfaces is negligible and the lappel seal will be virtually indestructible. With either type of sealing arrangement a more leak proof shut off is obtained then with previously known pivotal type valves.

Turning now to Fig. 11, it can be seen that plenum chamber 7 is provided with a plurality of screens 67 and 68 extending entirely across the diameter of this chamber. These screens provide a damping effect in the plenum section to prevent pressure fluctuation in the system. A resistance to high velocity flow is provided by the screens, causing the flow distribution to equalize which will eliminate any tendency toward pressure fluctuation in the test section. In order to withstand the higher air loads near the control valve, it is preferred to form the first screen 67 from a metal plate perforated with a plurality of openings 69. In one example this screen is twenty-eight feet in diameter and constructed from a three-eighths inch steel plate. The perforations are also three-eighths of an inch in diameter and provide about twenty-five percent open area. Screens 68 may be of woven stainless steel wire of 0.021 inch thickness, fourteen mesh, to give forty-nine percent open area.

In some installations it may be advisable to provide an additional screen 70 around the exit from the valve (for clarity, shown only in Fig. 11). This may be substantially spherical as shown or may be cylindrical if desired. The latter screen has an effect in assisting screens 67 and 68 in eliminating fluctuations of pressure in the wind tunnel. Also, it serves to cut down on noise which may result from the air flow through the throat of the valve. Otherwise if there is a lareg expansion into the settling chamber there can be a cellular-type shock wave pattern which causes objectionable high frequency sound through this section of the tunnel. It is preferred to construct screen 70 of perforated plate, for example, of one-half inch thickness, with one-half inch holes, giving a twenty-five percent open area.

It is apparent from the foregoing that we have provided an improved control valve arrangement offering marked advantages over the prior art. The fact that the control valve is cylindrical in form and disposed at the axis of the tunnel, throttling by sliding toward a convergent section, means that substantially uniform flow distribution will be obtained, thus assuring improved flow conditions in the wind tunnel test section. The valve has two important safety features which are not found in the prior art arrangements. When completely closed the storage tank pressure acts on the downstream end of the slidable sleeve to assure that the valve will remain in a closed position until a positive force unseats it. When open the reduced pressure at the upstream end of the slidable sleeve means that should the hydraulic system fail the valve will immediately and automatically close. All of this is obtained by a relatively simple construction which is fast in its action and accurate in its control. The use of screens in the plenum section further assures good test conditions by eliminating pressure fluctuations in the system.

The foregoing detailed description is to be clearly understood as given by way of illustration and example, the spirit and scope of this invention being limited only by the appended claims.

We claim:

1. In a wind tunnel having a duct section divergent downstream, a control valve comprising a fixedly mounted first hollow sleeve member coaxial and symmetrical with respect to said divergent section, said first sleeve member having a closed downstream end and an open upstream end; a second sleeve member closely fitted in the interior of said first sleeve member, said second sleeve having open ends and being axially reciprocal relative to said first sleeve member between a retracted downstream position and an extended upstream position with the upstream end thereof projecting from said first sleeve member, said second sleeve member being dimensioned to engage portions of said wind tunnel section upstream of said first sleeve member when in said extended position whereby said control valve is effective to throttle air flow through said wind tunnel section; and means for effecting such reciprocal movement of said second sleeve member.

2. In a wind tunnel having a duct section having a contour divergent downstream, an airflow control means comprising a first sleeve member coaxial with and rigidly supported in said divergent portion and symmetrical with respect thereto, said first sleeve member having an open upstream end, a hollow interior and a closed downstream end; a second sleeve member in said first sleeve member, said second sleeve member being complementary to and reciprocal relative to said first sleeve member between upstream and downstream positions, said second sleeve member being hollow and having open ends, said second sleeve member being dimensioned to engage portions of said duct section upstream of said first sleeve member when in an upstream position; and remotely operated means for effecting such reciprocal movement of said second sleeve member.

3. An air control arrangement for a wind tunnel having a source of pressurized air and a nozzle and test section downstream thereof, said device comprising an enlarged duct portion interposed between said source of pressurized air and said nozzle, said enlarged duct portion including a section divergent downstream; a first sleeve member rigidly supported in said enlarged duct symmetrical and coaxial therewith, said first sleeve member having a closed downstream end and an open upstream end; a second sleeve member sealingly received in said first sleeve member, said second sleeve member having open ends and being axially movable relative to said first sleeve member through said open end thereof, said second sleeve being dimensioned whereby when said second sleeve member is extended through said open end of said first sleeve member the upstream portions thereof are engageable with portions of said divergent section upstream of said first sleeve member whereby said sleeves co-operate to control and throttle air flow through said enlarged duct; means for effecting such axial movement of said second sleeve member; and at least one screen radially disposed across said enlarged duct downstream of said sleeve members for providing dampening means for air flowing through said enlarged duct.

4. In a wind tunnel having a source of pressurized air and a nozzle, an air control arrangement comprising a duct section interposed between said source of pressurized air and said nozzle, said duct section having an upstream portion of relatively small diameter, a downstream portion of larger diameter and an intermediate portion interconnecting said upstream and downstream portions having a contour divergent downstream; a first sleeve rigidly supported in said duct coaxial and symmetrical with respect thereto, said first sleeve having an open upstream end and a closed downstream end whereby an annular passage is defined between said first sleeve and said duct; a beam coaxial with said first sleeve and projecting through said upstream end thereof; a second sleeve on said beam, said second sleeve having an open passageway therethrough and sealingly engaging said first sleeve, said second sleeve being axially reciprocal relative to said first sleeve from a retracted downstream position to an extended upstream position projecting from said open end of said first sleeve, said second sleeve member being dimensioned to complementarily engage portions of said duct at the upstream end of said intermediate portion when said second sleeve member is in said extended position and being sealingly arranged with said upstream end of said intermediate portion when in such engagement whereby said second sleeve controls the size of said annular opening and throttles air flow through said duct; and means for effecting such reciprocation of said second sleeve.

5. In wind tunnel having a source of pressurized dried air; and an interconnected nozzle test section and diffuser connected to said source of pressurized air whereby said source of pressurized air provides a flow therethrough; a control means interposed between said source of pressurized air and said nozzle, said control means comprising a duct section receiving air from said source of pressurized air for transmitting the same, said duct section having an inlet of divergent downstream contour, a first sleeve fixedly supported in said duct section symmetrical and coaxial therewith, said first sleeve having an open upstream end and a closed downstream end, an open ended second sleeve sealingly received in said first sleeve, said second sleeve being axially reciprocal between downstream and upstream positions and dimensioned to engage portions of said divergent duct section upstream of said first sleeve when in said upstream position whereby such reciprocal movement of said second sleeve throttles and controls air flow through said divergent duct section, means for effecting such reciprocal movement of said second sleeve, and flow damping means in said duct downstream from said second sleeve member.

6. A device as recited in claim 5 in which said flow damping means comprises a rounded screen adjacent said first sleeve, and at least one substantially planar screen across said duct and downstream of said rounded screen.

7. In wind tunnel having a source of dried pressurized air; and an interconnected nozzle, test section and diffuser, an air flow control arrangement comprising a plenum chamber interconnecting said source of pressurized air and said nozzle, said plenum chamber having a duct section divergent downstream; a first sleeve member; means fixedly supporting said first sleeve member in said divergent section in axially aligned relationship therewith, said first sleeve member having a closed downstream end and an open upstream end; a second sleeve member; means supporting said second sleeve member in said first sleeve member for reciprocal movement relative thereto from a retracted downstream position to an extended upstream position with the upstream end thereof projecting beyond said first sleeve; and means for normally effecting such reciprocal movement of said second sleeve member, the exterior of said second sleeve member sealingly engaging the interior of said first sleeve member, said second sleeve member having an open passageway therethrough for admitting air from said source to the downstream end thereof, said duct section of divergent contour having an inwardly projecting annular shoulder, an upstream end portion of said second sleeve member being complementary to said shoulder and adapted to engage the same when said second sleeve member is in said upstream position whereby when said second sleeve member is in said upstream position pressurized air engages said downstream end thereof while said upstream end portion is free of pressure therefrom, said air pressure thereby maintaining said second sleeve member in said upstream position.

8. In a wind tunnel having a source of pressurized air connected to a nozzle, test section and diffuser for supplying air thereto, a control means comprising a duct section of divergent contour interposed between said source of pressurized air and said nozzle; a first sleeve member fixedly mounted in said section of divergent contour in axially aligned relationship therewith, said first sleeve member having an open upstream end and a closed downstream end; a second sleeve member received in said first sleeve member, the exterior of said second sleeve member sealingly engaging the interior of said first sleeve member, said second sleeve member having an open passageway therethrough, beam means projecting along the axis of said second sleeve member for providing a support therefor, hydraulic cylinder means on said beam means for effecting movement of said second sleeve member from a retracted downstream position to an extended upstream position wherein the upstream end of said second sleeve projects from said open end of said first sleeve, whereby such movement of said second sleeve member controls air flow through said divergent section.

9. In a wind tunnel having a source of pressurized air connecting to a test section, a control means for said source of pressurized air, said control means comprising a duct section divergent in a downstream direction; a first sleeve member rigidly supported in said duct section, said first sleeve member having an open upstream end and a closed downstream end; a second sleeve member sealingly received in said first sleeve member; beam means along the axis of said second sleeve member for supporting the same; and remotely controlled power operated means for effecting reciprocal movement of said second sleeve member relative to said first sleeve member from a retracted downstream position to an extended upstream position, said second sleeve member being adapted when extended to engage annular portions of said divergent duct section at the throat thereof and upstream of said first sleeve member whereby such reciprocal movement of said second sleeve member controls the air flow through said divergent section.

10. In a wind tunnel having an air supply source and a nozzle, a control device comprising an air duct interposed between said air supply and said nozzle, said duct including an upstream portion of relatively small diameter and a downstream portion of relatively large diameter; a first sleeve fixedly supported in said duct and downstream of said portion of relatively small diameter, said first sleeve having a closed downstream end and an open upstream end; a second sleeve sealingly engaging said first sleeve around the circumference thereof; and means for effecting reciprocal movement of said second sleeve relative to said first sleeve between an upstream position with the upstream end of said second sleeve adjacent said portion of relatively small diameter and a downstream position remote from said portion, said upstream end of said second sleeve being substantially complementary to said portion of relatively small diameter.

References Cited in the file of this patent

UNITED STATES PATENTS

| 2,354,161 | Waterman | July 18, 1944 |
| 2,618,972 | Leduc | Nov. 25, 1952 |
| 2,632,295 | Price | Mar. 24, 1953 |
| 2,725,891 | Bourguignon et al. | Dec. 6, 1955 |

OTHER REFERENCES

Publication, A. Gardograph #1, N. A. T. O. pub. May 1954, pp. 18, 19, 74, 75, 101, "Design and Operation of Intermittent Supersonic Wind Tunnels" by A. Ferri et. al. Copy in 73–147.